Feb. 13, 1951 W. F. HEROLD 2,541,514
INDUSTRIAL TRUCK CASTER WHEEL
Filed Sept. 29, 1944 2 Sheets-Sheet 1
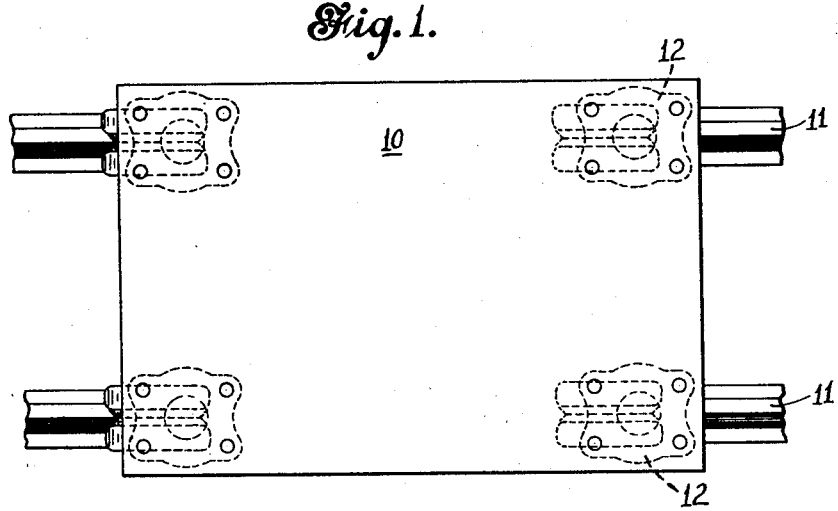
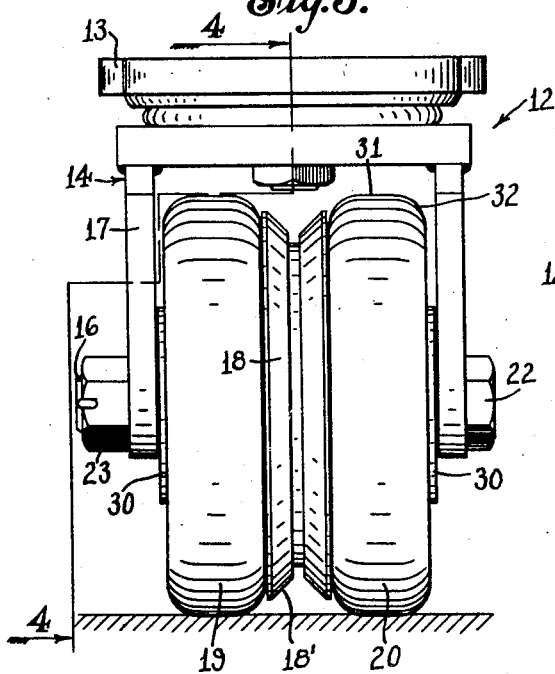
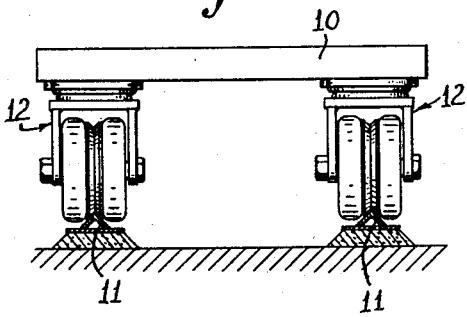
Inventor
Walter F. Herold

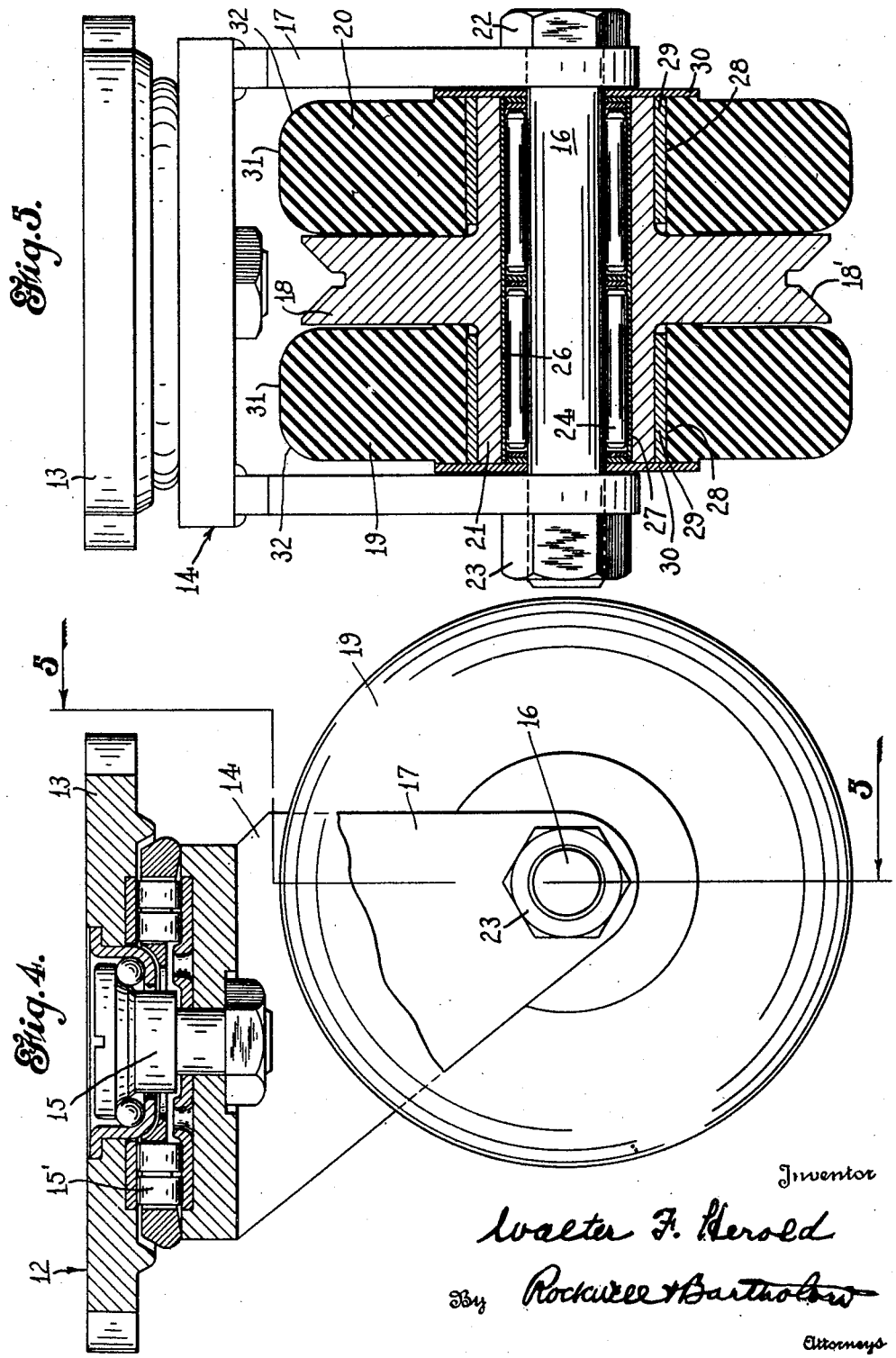

Patented Feb. 13, 1951

2,541,514

UNITED STATES PATENT OFFICE 2,541,514

INDUSTRIAL TRUCK CASTER WHEEL

Walter F. Herold, Easton, Conn., assignor to The Bassick Company, Bridgeport, Conn., a corporation of Connecticut Application September 29, 1944, Serial No. 556,383

8 Claims. (Cl. 295—8.5)

In my Patent No. 2,361,290, dated October 24, 1944, I have described an industrial truck equipped with wheels which adapt the truck for use either on a track comprising upstanding rails, or on a planar surface such as a floor. When the truck is mounted on a track it may be used in connection with assembly operations in industrial plants, for example airplane plants, in which operations precise guidance of the truck or platform by a trackway may be of importance. In the example shown in the above-mentioned patent, the truck is provided with casters of a special kind, at least some of which are of the swiveling type, so that when the truck rolls on the ground or floor it can be steered in various directions as desired. The caster wheel as there shown comprises a single rolling body having in the middle portion a track-engaging groove, and at opposite sides of the groove cylindrical portions adapted to support the truck on a planar surface when it is removed from the rails.

One of the objects of the present invention is to furnish a wheel structure of an improved kind, whereby certain advantageous features are provided.

A drawback of the previous wheel structure of this general type arose from the fact that in a swiveling caster running on the floor there was a certain abrasive action between the floor and the wheel when the truck was being turned, owing to the fact that the inner part of the wheel was disposed on a smaller radius than the outer part. One of the objects of the present invention is to overcome this drawback.

Another object is to provide a wheel structure having three substantially separate rolling portions, in which the strain on the supporting axle is effectively resisted so as to give the mounting as a whole a maximum amount of strength.

To these and other ends the invention consists in the novel features and combinations of parts to be hereinafter described and finally pointed out in the claims.

In the accompanying drawings:

Fig. 1 is a top plan view of an industrial truck embodying my improvements, showing the same mounted upon a track;

Fig. 2 is a front elevation of the vehicle shown in Fig. 1, the rails being shown in section;

Fig. 3 is an enlarged front elevation of one of the casters showing it as it appears when rolling on a planar surface;

Fig. 4 is an enlarged section on line 4—4 of Fig. 3; and

Fig. 5 is a section on line 5—5 of Fig. 4.

In the drawings there is shown, in Figs. 1 and 2, a truck of the general character described in my Patent No. 2,361,290, above mentioned, said truck comprising a body 10 adapted to be guided along two rails 11, or to roll on a planar surface such as a floor, for which purpose the truck is equipped with casters, each having a middle groove to engage the track rail, and at opposite sides of the groove substantially cylindrical portions which adapt it for rolling on the floor or on the ground. In the present instance the truck body is equipped near the corners thereof with casters such as indicated at 12, and in this instance it may be assumed that all of these casters are of the swiveling type, the wheel being mounted to swing freely with respect to a vertical axis. One of the casters is shown in detail in Figs. 3, 4 and 5.

The caster comprises an attaching plate 13 having the usual holes whereby it can be screwed or bolted to the truck body at the under portion of the latter. Beneath the plate 13 is a fork or horn 14 swiveled to turn about a vertical axis, such axis being provided by means such as a swiveling bolt 15 connecting the horn to the plate. Suitable anti-friction members, such as rollers 15', are preferably interposed between the upper part of the horn and the lower surface of the plate, as shown. At the lower end of the horn the latter carries an axle 16, which axle is preferably somewhat offset from the swiveling axis, as appears from Fig. 4. On the axle 16 and between the legs 17 of the horn is provided a wheel or rolling element comprising essentially three separate rolling portions. The first of these portions is generally indicated at 18 and comprises a wheel member adapted to engage and be guided upon the guide rail 11. The other two portions are generally indicated at 19 and 20, respectively, and these are separate members provided upon the axle at the respective sides of the member 18.

The guide rail 11 preferably has the cross section of an inverted V, and the member 18 has in its periphery a V-shaped groove 18'. Preferably the arrangement is as shown in Fig. 2, from which it appears that when the truck is on the track the member 18 engages the summit only of the rail, the track-engaging portion of member 18 being of substantially less width than the base of the rail. The member 18 is preferably made of metal, such as steel or bronze, and it has integral therewith a hub 21 of extended length so as to provide support for the side members 19 and 20.

The axle 16 is in the form of a bolt-like member extending through holes in the horn legs and having an external head 22 at one end. At the opposite end the axle is equipped with a nut 23. Around the axle are mounted rollers 24 which support a metal sleeve 26, and this metal sleeve is arranged within a longitudinal bore 27 with which the wheel member 18 is provided, being located in contact with the inner surface of said bore.

The wheel members 19 and 20 are preferably constructed of non-metallic material, and it is preferred to form them as molded members of a thermosetting material, for example a suitably compounded composition including rubber or rubber-like material, the composition being cured by heat and having considerable hardness, but at the same time a certain amount of resiliency. These wheel members are located at the respective sides of the body of member 18 and are set over the extended hub 21 so as to be supported thereby. The member 19 or 20 is provided with a central hole 28, which enables it to be fitted over a metallic bushing 29 embracing the corresponding portion of the hub 21. The assemblage is completed by providing a washer 30 adjacent the end of the hub, said washer having a hole whereby it embraces the axle body, and the washer extending over the end of the hub 21 and over the bushing 29, and also extending over a portion of the member 19 or 20, as shown in Fig. 5. The arrangement is such that the composite wheel structure thus provided, which is free to turn about the axle, is held against movement along the axle to any appreciable extent, and preferably this result is secured by an arrangement such as that illustrated, where only narrow spaces are left between the ends of the hub 21 and the outer faces of the members 19 and 20 on the one hand, and the inner surfaces of the horn legs on the other hand, and where the washers 30 substantially fill these narrow spaces.

While the wheel members 19 and 20 are provided with cylindrical surfaces 31, which adapt them for rolling on the ground or on a floor, the wheel member in profile preferably has rounded portions 32 at the respective sides of the cylindrical surface so as to avoid any sharp corner or edge. It will also be noted that, while the diameter of each wheel member 19 or 20 approximates that of the member 18, it is preferred to have the diameter of the composition wheel member slightly greater than that of the metal member for a purpose to be mentioned later on. In the form now being described it is assumed that the bushings 29 are free to turn on the hub 21, so as to provide for rotation of member 19 or 20 independently of member 18. It is also assumed that in this particular case the member 19 or 20 has a tight fit on the corresponding bushing 29, but obviously variation may be made in these details.

It will be apparent from the foregoing that when the truck is track-guided the wheel members 18 will guide the truck along the track in a precise manner. The wheel members 19 and 20 will then be out of action as they will be spaced upwardly from the underlying surfaces of the trackway, as indicated in Fig. 2. As their inner portions are rounded, as indicated at 32, there will be preferably a substantial amount of clearance between the composition members and the V-shaped rail. When, however, the truck is placed on a floor, for example, the composition members will act to support the truck in the manner indicated in Fig. 3, the rail-engaging portion of the member 18 being inactive. However, the hub portion 21 of member 18 is active because the same serves as a support for the composition members. As the truck rolls along the floor the rim of the middle member makes no contact with the floor, there preferably being a substantial spacing upwardly from the floor, as in the example shown. This has the advantage that, as the truck rolls over the floor, the likelihood of a spark being created between the floor, or some object on the floor, and the metallic portion of the wheel is overcome. This is of great advantage when the truck is used in a factory where there is a possibility of fire or explosion resulting from a spark.

When the truck in rolling on the floor is turned to one side or the other, the tendency is for one side of the wheel structure to rotate faster than the other side, or to rotate in the opposite direction, and this is permitted in the structure of the present invention, owing to the independent rotary mounting of the two side elements on the axle. Were this wheel structure made in a single piece the swiveling about the vertical axis would result in considerable abrasive action between the tread and the floor. This is obviated by providing the independently rotatable side members. Another important advantage also arises from the arrangement whereby the side members and the middle member are mounted relatively to each other, the middle member having support from the axle in spaces located in bores of the side members. It will be understood that when the vehicle is mounted on the track the strong support of each rail-engaging member is important, and this is provided in the present instance owing to the fact that the middle element has support not only from the middle part of the axle but also from those portions of the axle which are adjacent the horn legs and have a shorter bending moment. These end portions of the axle which are strongly supported by the horn are, as will be apparent, additionally useful in providing strong support for the side elements of the wheel when the vehicle is supported on a planar surface.

While only a single embodiment of the invention is illustrated in the drawings, it will be understood that various modifications and changes may be made without departing from the principles of the invention or the scope of the claims.

What I claim is:

1. A wheel mounting for an industrial truck, comprising a support carried at the underneath portion of the truck, an axle carried by said support, a middle wheel on said axle having a groove enabling the truck to be mounted on and guided along a track rail, said wheel having extended hub portions at the respective sides, and side wheels concentric with and rotatable on said hub portions.

2. A caster for industrial trucks having a horn, an axle carried by the horn, a grooved rail-engaging wheel mounted upon the axle, and wheels of composition material mounted about the axle at the respective sides of the grooved wheel and independently rotatable, the grooved wheel having an extended hub on which the other wheels are supported.

3. A caster for industrial trucks having a horn, an axle mounted in the horn, a track-engaging middle wheel mounted upon the axle and provided with a hub portion extended beyond the respective sides of said wheel, and floor-engaging wheels rotatably supported on said hub portion at the respective sides of the first wheel.

4. A caster for industrial trucks having a horn, an axle mounted in the horn, a track-engaging middle wheel mounted upon the axle and provided with a hub portion extended beyond the respective sides of said wheel, and floor-engaging wheels rotatably supported on said hub portion at the respective sides of the first wheel, the floor-engaging wheels being of non-metallic material and arranged to prevent contact of the rail-engaging wheel with the floor when the truck is supported on the floor.

5. A caster for industrial trucks having a horn, an axle extending across the space between the terminals of the horn, a wheel portion disposed rotatably about said axle provided with a groove to engage a rail, said wheel portion being of metallic material, coaxial wheel portions at the sides of said first wheel portion adapted to roll on a planar surface, the second wheel portions being rotatable independently of the first and constructed of non-metallic material and being of larger diameter than the first wheel portion, and means of engagement between said wheel portions whereby the second wheel portions are supported from the first.

6. A caster for industrial trucks having a horn, an axle carried by the horn, a middle wheel mounted upon the axle, and larger wheels of different material from the first mounted about the axle at the respective sides of the first wheel, the first wheel having an extended hub on which the other wheels are supported for independent rotation.

7. A caster for industrial trucks having a horn, an axle carried by the horn, a middle wheel mounted on the axle and having extended hub portions at the sides such that said wheel is axle-supported substantially throughout the length of the axle, said middle wheel being formed to engage a track rail, and side wheels of larger diameter than the middle wheel concentric with and rotatable about the extended hub portions of the middle wheel.

8. A caster for industrial trucks having an axle and three wheels rotatably supported upon said axle, one of said wheels being a metallic wheel having an extended hub, and the other of said wheels each being constituted by a molded body of plastic material of greater diameter than said first wheel apertured to fit over said hub and rotatable about the hub.

WALTER F. HEROLD.

REFERENCES CITED

The following references are of record in the file of this patent:

UNITED STATES PATENTS

| Number | Name | Date |
| --- | --- | --- |
| 218 | Planton | June 3, 1837 |
| 270,605 | Paepke | Jan. 16, 1883 |
| 1,730,875 | Brown | Oct. 8, 1929 |
| 1,854,487 | Ronk | Apr. 19, 1932 |
| 1,886,573 | Nelson | Nov. 8, 1932 |
| 2,135,307 | Keator | Nov. 1, 1938 |
| 2,242,454 | Cochran | May 20, 1941 |
| 2,361,268 | Cochran | Oct. 24, 1944 |